United States Patent [19]

Trausi et al.

[11] Patent Number: 5,507,164
[45] Date of Patent: Apr. 16, 1996

[54] PROGRAMMED FORGING SYSTEM WITH GRAPHIC INTERFACE

[75] Inventors: Mark A. Trausi, Port St. Lucie; Randy B. Helvey, Stuart, both of Fla.

[73] Assignee: United Technologies Corporation, Hartford, Conn.

[21] Appl. No.: 956,213

[22] Filed: Oct. 5, 1992

[51] Int. Cl.$^6$ ........................................ B21J 7/46
[52] U.S. Cl. ................................ 72/37; 72/31.01
[58] Field of Search ...................... 72/37, 38, 10, 72/11, 12, 13, 16, 21, 26, 352; 364/472 X, 188 X, 189

[56] References Cited

U.S. PATENT DOCUMENTS

| | | | |
|---|---|---|---|
| 2,944,500 | 7/1960 | Raynes | 72/37 |
| 3,350,906 | 11/1967 | Levinson et al. | 72/37 |
| 3,698,219 | 10/1972 | Moore et al. | 72/342.8 |
| 4,262,511 | 4/1981 | Boisvert et al. | 72/34 |
| 5,007,265 | 4/1991 | Mahoney et al. | 72/37 |
| 5,224,053 | 6/1993 | Cook | 364/189 |

FOREIGN PATENT DOCUMENTS

| | | | |
|---|---|---|---|
| 22417 | 2/1980 | Japan | 72/13 |
| 0250837 | 12/1985 | Japan | 72/37 |
| 0309727 | 12/1989 | Japan | 72/37 |
| 0299711 | 12/1989 | Japan | 72/21 |
| 0147121 | 6/1990 | Japan | 72/37 |
| 0243217 | 10/1991 | Japan | 72/37 |

*Primary Examiner*—Lowell A. Larson
*Attorney, Agent, or Firm*—Robert E. Greenstien

[57] ABSTRACT

A forging system comprises a furnace with heating elements to heat a billet which is pressed against a die at a controlled rate and pressure. A signal processor controls the temperature, pressure and rate as a function of parameters entered on a keyboard the signal processor displays those parameters along with real time values of temperature pressure and distance for the billet in a graphical interface that includes a model of the billet and furnace with elements that change size during the forging processor. Forging pressure is displayed, in this interface, on an incremented bar.

16 Claims, 4 Drawing Sheets

5,507,164

PROGRAMMED FORGING SYSTEM WITH GRAPHIC INTERFACE

TECHNICAL FIELD

This invention relates to techniques and equipment for forging.

BACKGROUND OF THE INVENTION

In some fields, gas turbine engines in particular, a continual need to produce stronger and lighter metal parts, such as airfoils, with high yield forging techniques presents substantial challenges with significant opportunities for product improvement. In many respects, forging is an "art", involving, at least superficially, nothing more than simply heating a block of material (the "billet") and forcing it under considerable force into a die (form), usually with a ram. This is hardly true. The fact is that the skill of the operator can be important in ensuring careful control of the forging process, especially when the process calls for specific, critical combinations of temperature and pressure to produce a forged article, such as a turbine blade, with unique strength and heat resistance characteristics, rather than a worthless chunk of alloy. In fact, some processes, such as the GATORIZING process, developed by the Pratt & Whitney division of United Technologies Corporation, assignee of this application, produce very special forging by precisely controlling billet temperature and ram motion and pressure. Repeatable forging is important in precision processes such as GATORIZING to increase "yield", because, by increasing the yield, part costs can be reduced.

DISCLOSURE OF THE INVENTION

An object of the present invention is providing more precise forging with less reliance on the operator.

Another object of the present invention is providing a particularly useful graphic interface between a forge operator and the furnace and billet, an interface that permits the operator to observe, in "real time", meaningful changes in the billet as the forging process proceeds from start to finish. With this approach, there is more assurance that the process can be reliably repeated. According to the invention, a signal processor provides on a monitor a real time model of the furnace and billet that contains cues or prompts for various numerical values to be "inputted" on a keyboard at the inception and beginning of the process. Also part of the display, real time values of selected forging parameters, some measured by sensors under the control of the signal processor, others fixed, are entered by the operator. Ram pressure, especially important in the precise forging, is displayed graphically as a graduated bar. As the forging takes place, the monitor is updated continuously. The dimensions of the billet change on the displayed model as a function of the duration, measured temperature and pressure and the initial height and billet width.

According to one aspect of the invention, signals manifesting temperature, pressure and billet position relative to the die (form) are compared with commanded or dictated parameters that are calculated as a function of initial billet dimensions. Under the control of the signal processor, temperature pressure and billet movement are regulated to achieve the commanded forging results. Throughout the forging process, the signal processor changes the model based upon measured values.

According to one aspect of the invention, as a forging process takes place, the change in position of the billet is sensed at consecutive time intervals and using initial billet locations, the change in height and width of the billet are calculated using stored equations. From that, the billet model is modified in proportion to those changes.

According to another aspect of the invention, temperatures at select locations inside the furnace are shown at corresponding locations on the model. In particular, temperatures at different locations on the furnace wall are numerically shown in corresponding locations on the furnace model.

Among the features of the present invention, it provides a reliable and highly repeatable way to conduct precise forging because the invention gives the operator meaningful information in an interactive environment by simulating what the operator cannot see (only extrapolate) in the state of the art. This eliminates much of the guess work that characterizes the state of the art forging. The invention is particularly beneficial in a precise process such as the GATORIZING process, where precise velocity control has been found to be essential. Other objects, benefits and features of the invention will be apparent to one skilled in the art from the following discussion of the invention.

BEST MODE FOR CARRYING OUT THE INVENTION

Figure 1:
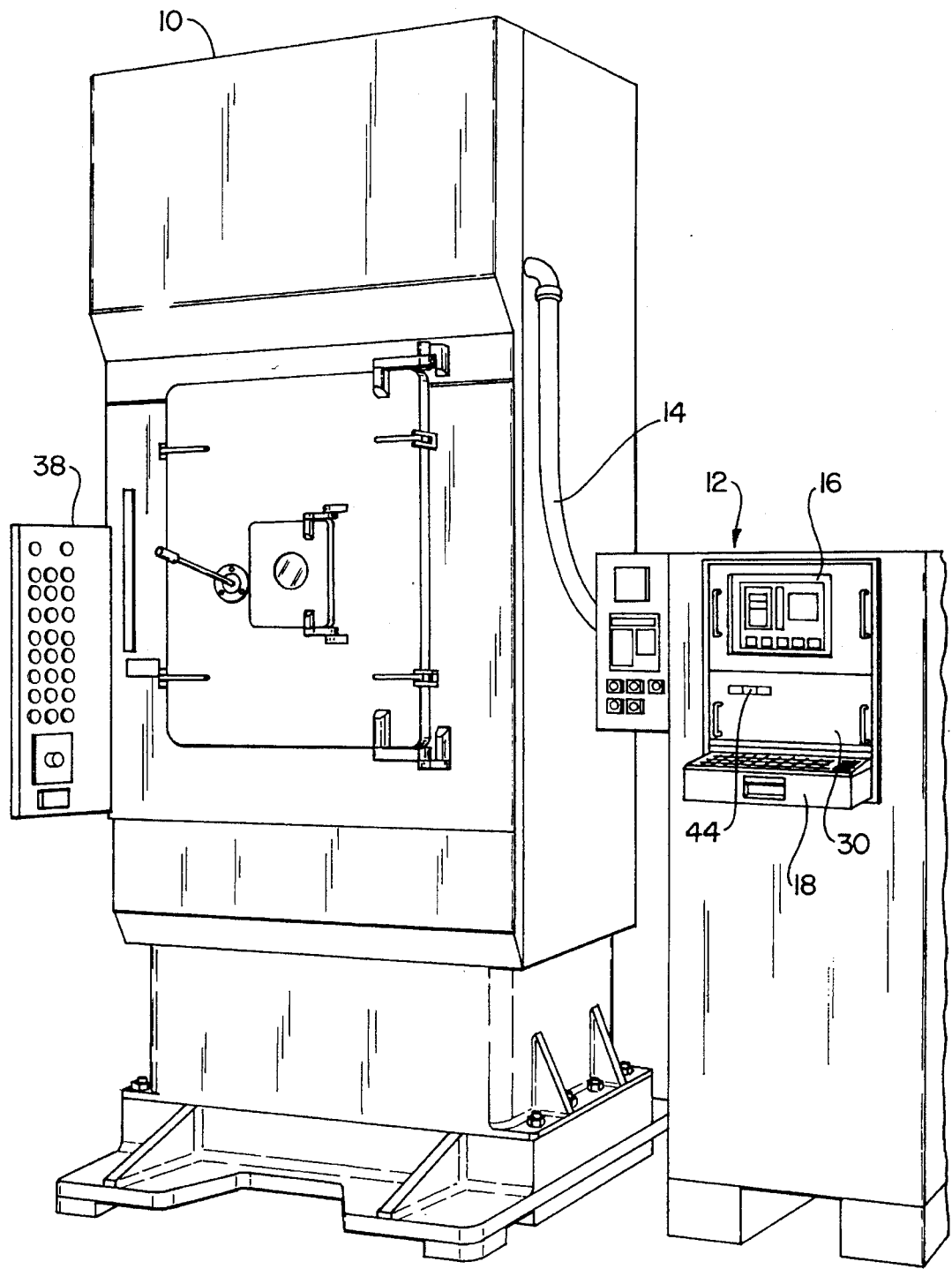
FIG. 1 is a perspective of a forging system embodying the present invention.
Figure 2:
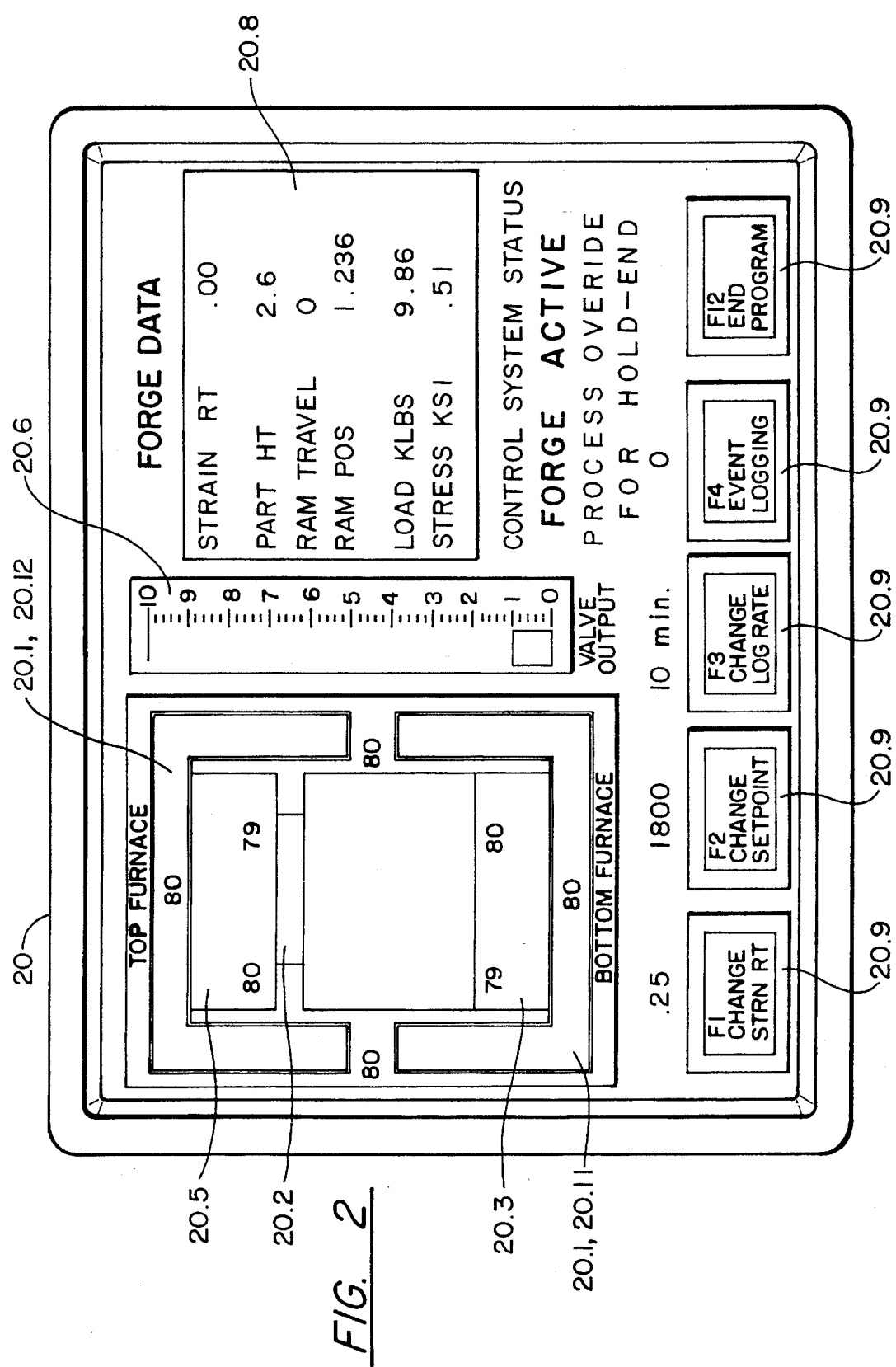
FIG. 2 shows a graphic interface for a forge control according to the present invention.

Referring to FIGS. 1 and 2, a forge system embodying the present invention includes a forging furnace 10 and a control station 12, connected to the furnace 10 by a plurality of cables 14. Data on temperature, ram pressure and ram movement, flows back and forth between the control station 12 to sensors and controls, within the furnace and functionally shown in FIG. 3. The present invention focuses on providing information to the operator through the station 12, and, in that respect, it should be noted that the station contains a color display 16 that provides a graphic interface 20 in FIG. 1. The station 16 also includes a keyboard 18, by which the operator enters information into a computer 30 that controls the forging process within the interior of the furnace 10 as a function of stored instructions that are supplied by a signal processor (30.1 in FIG. 3) in the computer, which may be a conventional type, such as one with a 286 or 386 processor and standard 60 megabyte hard-drive 44. These components have been used in that operating environment to carry out the invention: an expansion board from National Instruments, model No. ATM1016 for sensing furnace temperatures; SCREENWARE programmers interface by CTC, Corp., software, programmed to produce the displays embodying the invention; QUICK-BASIC software from Microsoft Corporation, for basic computer operations, e.g calculations and commands; and a motion controller model No. MTS-470 from MTS Systems Corporation for closed loop control of the ram and INCOL software also from MTS Systems. Contrasted with the state of the art manual approaches, it should be recognized that the invention produces a model showing what is happening in the furnace numerically and graphically, whereas in the state of the art the operator calculates the results by hand as the process proceeds.

For instant purposes, the details of forging per se are not particularly germane. It should be sufficient to recognize that in a typical forging furnace, heat is applied uniformly to a piece of alloy, usually called the "billet", and a hydraulic ram is also located in the furnace, where the ram forces the heated billet against a die (form), also heated by the furnace. Heating must be uniform and precise; ram pressure and motion must also be precise, especially to produce parts with specific material qualities. As an example, it may be necessary to insure that as the temperature is maintained at a near constant level, that ram motion is constant. On the other hand, to provide a different material, the rate of movement (the rate at which the billet is pressed against the die or form) may not be constant. In the system shown in FIG. 2, forge operations are carried out under the control of the operator through the station 12, which affords the operator an environment in which changes in the billet are simulated based on actual operating conditions in the furnace.

FIG. 2 shows that the graphic interface provided by the invention contains a model—a simulation—of the furnace. To be specific, the model includes heated furnace walls 20.1, which generally surround the billet 20.2, which rests on a ram 20.3. In actuality, and shown in the model/simulation, the billet is heated by furnace walls along with the die 20.5 at the top of the furnace. During forging, the ram pushes the billet against the die, and, throughout the process, the billet is surrounded by furnace walls. For the purpose of applying uniform heat to the billet, it is possible to move the bottom furnace walls 20.11 upward with the billet with separate controls 38. As the forging takes place, the vertical size of the ram 20.3 in the display will increase reflecting the fact that the vertical height of the ram increases as it forces the billet 20.2 against the die (form) 20.5. The display also shows the different furnace wall locations, e.g. bottom wall 20.11 and top wall 20.12. Located to the side of the model 20.1, is a graduated bar 20.6, where the graduations indicate ram pressure. It should be easy to appreciate that the display provides an interactive forging environment in which an operator scans between the furnace model and the bar as the process takes place, looking for anomalies between the two requiring some modification to the process. Located to the right of the bar 20.6, a data window 20.8 contains numerical values for the forging process. In this example, the data includes strain rate, the height of the part or billet, the ram position, the load or force by the ram and the stress in equal pounds per square inch on the billet, which are computed from the previous equations. At the bottom part of the display, are five control buttons 20.9, corresponding to keyboard function keys F1, F2, F3, F4 and F12 on a standard 102 key enhanced keyboard. Each of these functions is associated with a particular parameter in the forging process or a desired forging event. For instance, by pressing the F1 key on the keyboard, the operator will be allowed to change the strain rate. Function F2 allows the operator to change the set point located immediately above the control buttons— F1, F2 and F3 are representative values.

Figure 3:
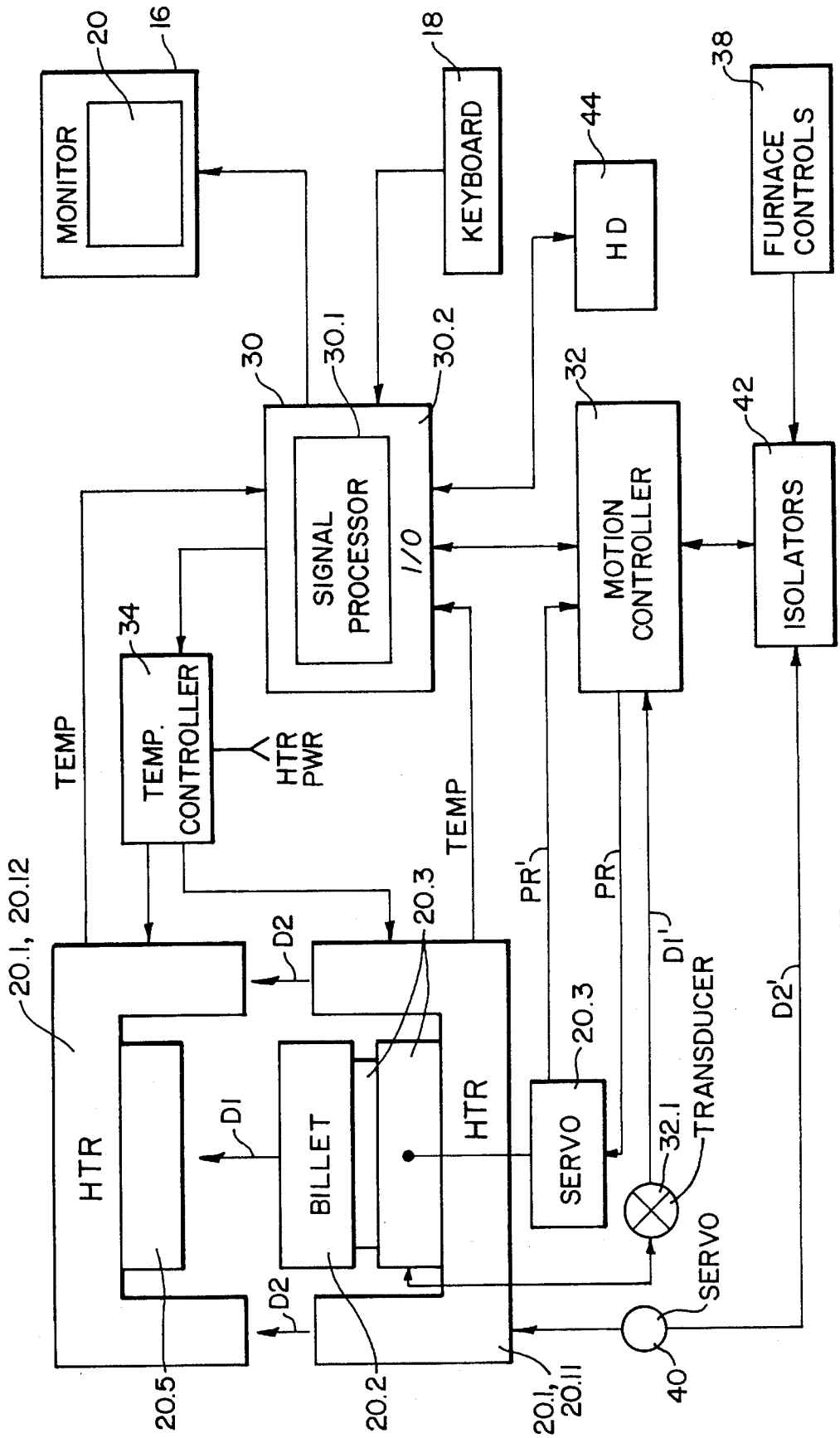
FIG. 3 is a block diagram of a forging system embodying the present invention.

Directing attention to FIG. 3, a functional block diagram, there the model of the furnace, billet and ram are included to establish the environment in which the control system of the present invention operates. The control system, which is housed in the control station 12, includes the computer 30 containing the signal processor 30.1 and input/output ports 30.2, over which the signal processor interfaces with its environment. The computer would contain the expansion board mentioned previously and would use the mentioned software to generate the graphic interface using programming instructions available with the program. Considering the level of skill in the use of computers for controlling systems, the computer 30 shown here has been greatly simplified. The monitor 16, which shows the display 20, is connected to the signal processor 30 through the input/output port 30.2, and the signal processor produces the display 20 as a result of information received from the furnace in the form of signals TEMP, D1 and D2. Conversely, the signal processor provides signals to a motion controller 32 (e.g. using the aforementioned software), a temperature controller 34 (e.g. the aforementioned expansion board with suitable input/output devices). The keyboard 18 is connected through the input/output port 30.2 to the signal processor 30.1. The motion controller 32 responds to signals from the signal processor by producing a signal D' which is provided to the ram 20.3. In response to the signal D', the ram is moved vertically upward within the furnace causing the billet to move a distance D1. A transducer 32.1, connected to the ram, provides a feedback signal D1' to the motion controller. This signal indicates the magnitude of D1 and hence the displacement of the billet. The temperature controller 34 modulates heater power to furnace heaters contained within the heater portion of the furnace. Furnace controls 38 are provided, as mentioned before, to operate another servo 40, capable of moving the lower walls 20.11 as the billet moves. This may be initiated by the operator separately to ensure that uniform heat is applied to the billet throughout its range of motion. These furnace controls 38 are connected to the servo through opto-isolators 42. A hard disk drive 44, connected to the signal processor, contains basic programs and data files for specific forging operations, including logs on forging processes, allowing data retrieval for each forging. The disk contains the computation programs that perform calculations using QUICKBASIC language on the following equations to generate various values and parameters that control the process.

Figure 4:
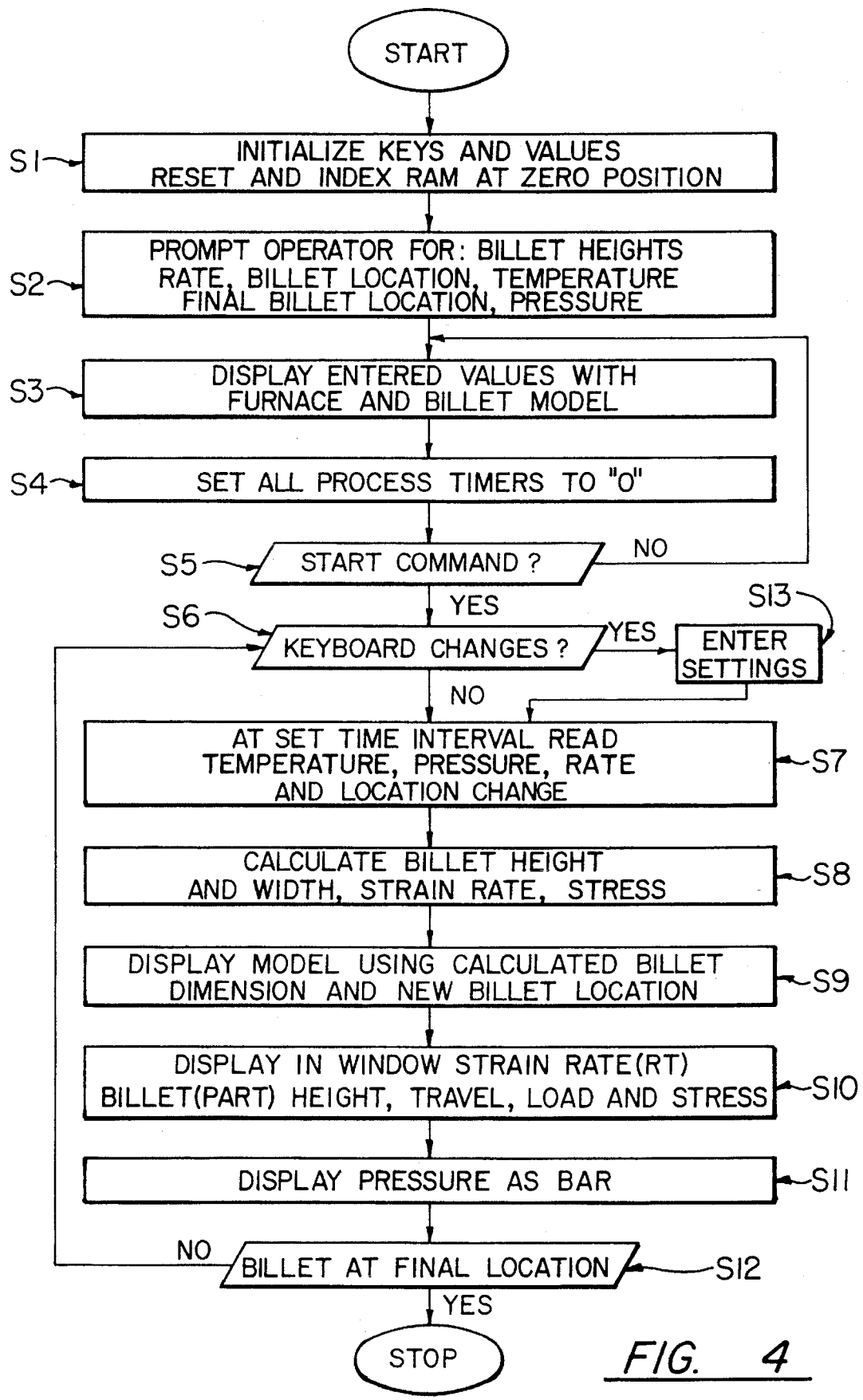
FIG. 4 is a flow chart showing signal processing steps for controlling a forge according to the present invention.

FIG. 4 describes the processing sequences for a typical forge run, and, in that context, it should be remembered that changes in billet
1) NH=OH−TR
2) ND=(OD)·(OH/NH)$^{0.5}$
3) AREA=0.785(ND)$^2$
4) FLOW STRESS=LOAD/AREA
5) STRAIN RATE=(−LOAD·(NH/OH))/TIME
where:
OH=Old height of billet
NH=New height of billet
TR=Ram travel
ND=New diameter of billet
LOAD=Ram pressure
TIME=Minutes
dimension are computed during cyclical computer cycles using equations 1–5 and are then used, by the computer, to change the appearance (height and width) of the billet in the model 20.2, also during computer cycles, which occur at high processing speeds, e.g 16 mghz. At step S1, all of the keys and values used in the process are initialized. Then, in step S2, the operator is prompted to enter various parameters, in particular a desired strain rate, the height and diameter of billet and the temperature at which the forging process should take place. During the sequence that follows, it is possible for the operator to press the F1 or F2 function keys and change the strain rate or other settings. Also included in the values that the operator must enter are the coordinates for the billet based upon the start point for the ram. These coordinate the location of the billet, as measured by the operator, relative to the die (form) 20.5 when the die is contacted and likewise establishes the ram position at which the processor will know that the die is contacted. The operator would do this by indexing the ram to the die and returning it back to its initial point. This is but one way, however, to establish the starting point for forging—the position at which the die is contacted by the billet—the importance of which is that the contact point is used to compute changes in billet dimension, computed once the die is contacted. Step S3 causes the display (graphic interface) 20.1 to appear on the monitor. The signal processor tracks time intervals using software timers with standard programming processes and protocols, well known to those using computer control, and, for that reason, step S4 is a generalized timer reset step. In that step, all the process timers are set to zero in anticipation of the start of forging. Those timers do not begin to count up until the process is started which begins at step S5, when a start command is received from the control panel keyboard. An affirmative answer to step S5 brings the process to a query at step S6 where a test is made based upon whether there have been changes in any settings. Assuming that the process has just been started, there probably are no changes in the settings, leading to a negative answer at step S6. A positive answer, which would arise should the operator enter new settings through the F1 and F2 keys during the process, temporarily moves the sequence to step S13 where the new settings are entered, allowing the processor to use them for subsequent computations. Then at step S7, the temperature, pressure, rate of movement, change in location are sensed. Referring temporarily to FIG. 3, it should be remembered these are the signals TEMP and D1' and PR'. At step S8, the signal processor calculates the new billet height and width and the strain rate and stress based upon the following equations.

At this step, the processor has establish from the feedback signals that the billet 20.2 has contacted the die (form) and its shape is changing, albeit imperceptibly to the eye. This calculation calculates the change in shape using the aforementioned equations. In step S9, the program displays the model using calculated billet dimensions and new billet location. In other words, the height and width of the billet will now change slightly as compared to its height and width during a previous time interval. In addition, the part height along with the calculated strain rate and ram travel will be displayed in the window along with the calculated load and stress. This takes place in step S10. The simulation would not be complete without the display of the bar 20.6, which shows the ram pressure at an easy to read graphical interface side by side with the "dynamic" model of the forge furnace. At some point, the billet is at its final location yielding an affirmative answer to step S12 causing the process to stop. Until that point, the process cycles back through step S6 and this way through each time interval (established at step S7) the height and width of the billet will graphically change at the same time its dimensions, as displayed in the window, will also change along with the size of the ram pressure bar.

A point worth emphasizing is that this system provides a virtual hands-on way for a forging operator to conduct the forging process in an interactive medium, in contrast to the prior art, where an operator could only calculate what may be going on in the furnace. When it is necessary to maintain very precise control over ram speed under constant temperature, it can be seen that it is very easy for the operator to see whether ram pressure is rising and whether the billet shape is changing too rapidly. The menu arrangement, in conjunction with the model and the bar of ram pressure, also simplify modifying a forging process to achieve different results or solve problems. By storing the programs and logging (recording) the data for each forge operation on a hard disk, forging diagnostics is greatly simplified.

With the benefit of the foregoing discussion, one skilled in the art may be able to make modifications and variations to the invention in whole or in part without departing from the true scope and spirit of the invention as set forth in the claims that follow:

We claim:

1. A forging system, comprising a furnace for heating a billet and a ram for moving the billet against a die, characterized by:

a monitor, and signal processing means comprising means for generating on said monitor a model of the billet and heating elements in the furnace and for modifying the appearance of said model of the billet as a function of changes in calculated values using sensed billet movement relative to the die, said signal processing means including means for controlling a rate at which the billet is moved by the ram, ram pressure and temperature of said heating elements.

2. A system as described in claim 1, further characterized in that said processor includes means for providing on said monitor a bar manifesting ram pressure during a forging sequence.

3. A system as described in claim 2, further characterized in that said signal processor comprises means for displaying on the monitor a model of the ram and for changing the size of said ram to reflect ram movements, during a forging sequence, based on changes in ram position.

4. A system as described in claim 3, further characterized in that said graphic interface includes numerical values of forge parameters entered by an operator and control buttons for cuing the operator to enter parameters based as a function of stages of the forging process.

5. A system as described in claim 4, further characterized in that said signal processing means includes means for generating the walls of said furnace in said model and including in said walls temperatures of said walls.

6. A forging method characterized by the steps of:

entering initial billet locations and dimensions on a keyboard:

entering forge temperature and pressure on said keyboard;

displaying a model of a forge furnace and a model of a billet shown within the model of the forge furnace and on a surface representing a forge ram;

displaying simultaneously with said model a bar with a height manifesting ram pressure and keyboard buttons corresponding to keys on the keyboard that may be pressed to augment values previously entered on said keyboard; and changing the appearance of said model and said surface representing the forge ram to reflect movement of the forge ram and changes in the size of the billet as a forging process continues, and changing the height of said bar to reflect measured ram pressure.

7. The forging method described in claim 6, further characterized in that said model includes furnace walls and the temperature of said walls displayed in said walls using measured temperatures in the furnace.

8. The forging method described in claim 6, further characterized in that said display includes a control button for entering forging data from the keyboard and a window showing strain rate, billet height, ram travel, ram pressure and stress on the billet.

9. A forge system characterized by:

a forge furnace for heating a billet;

a ram for moving the billet against a form;

a connected control console comprising a signal processor keyboard and disk drive and display;

said signal processor comprising means for providing a plurality of graphic images simulating changes in height and width of the billet during a forging sequence as a function of values computed from measured changes in ram location and time duration from stored functions recalled and processed by said signal processor repetitively during a forging sequence.

10. The forge system described in claim 9, further characterized in that said signal processing means includes means for displaying changes in ram position.

11. The forge system described in claim 9, further characterized in that said signal processing means includes means for displaying ram pressure graphically.

12. The forge system described in claim 9, further characterized in that ram pressure is displayed as a graduated bar.

13. The forge system described in claim 12, further characterized in said signal processing means includes means for displaying walls of said furnace with the temperature of said walls in said displayed walls.

14. A method characterized by the steps:

heating a billet and pressing the billet against a form with a ram actuator to cause a change in billet location an shape;

operating signal processing means controlling a display to provide real time graphic images simulating changes in height and width of the billet based on measured changes in billet location and elapsed time for pressing the billet against the form, said changes being applied as values to functions stored in the signal processing means and recalled and processed by said signal processing means during repetitive display update cycles as said billet is pressed against said form to display said real-time graphic images.

15. The method described in claim 14, further characterized by:

heating the billet in a furnace and displaying a model of the furnace containing the billet and displaying furnace temperatures in displayed walls of the furnace.

16. The method described in claim 14, further characterized by:

displaying an image of the ran and the billet, changing the extension of the image of the ram as ram position changes; and changing the size of the image of the billet as the ram position changes with elapsed time.

* * * * *